(12) United States Patent
Momot et al.

(10) Patent No.: US 12,459,164 B2
(45) Date of Patent: Nov. 4, 2025

(54) METHOD OF MANUFACTURING A MOLD BODY

(71) Applicant: Aptiv Technologies AG, Schaffhausen (CH)

(72) Inventors: Piotr Momot, Spytkowice (PL); Szymon Bak, Cracow (PL); Artur Kliszka, Cracow (PL); Antoni Woźnicki, Cracow (PL)

(73) Assignee: APTIV TECHNOLOGIES AG, Schaffhausen (CH)

( * ) Notice: Subject to any disclaimer, the term of this patent is extended or adjusted under 35 U.S.C. 154(b) by 104 days.

(21) Appl. No.: 18/137,119

(22) Filed: Apr. 20, 2023

(65) Prior Publication Data
US 2023/0373133 A1 Nov. 23, 2023

(30) Foreign Application Priority Data
May 17, 2022 (EP) .................... 22173831

(51) Int. Cl.
  *B29C 33/38* (2006.01)
  *B29C 33/42* (2006.01)
  *B29K 75/00* (2006.01)
  *B33Y 80/00* (2015.01)

(52) U.S. Cl.
  CPC .......... *B29C 33/3842* (2013.01); *B29C 33/42* (2013.01); *B33Y 80/00* (2014.12); *B29K 2075/00* (2013.01); *B29K 2869/00* (2013.01)

(58) Field of Classification Search
  CPC ..... B29C 33/3842; B29C 33/42; B29C 33/56; B29C 33/58; B29C 33/62; B29C 45/26; B29C 45/263; B33Y 80/00; B29K 2075/00; B29K 2869/00
  See application file for complete search history.

(56) References Cited

U.S. PATENT DOCUMENTS

| | | | | |
|---|---|---|---|---|
| 2005/0167877 A1* | 8/2005 | Nun | ...................... | B08B 17/065 264/143 |
| 2006/0228434 A1* | 10/2006 | Freser-Wolzenburg | ...................... | B29C 33/424 425/134 |
| 2009/0246470 A1* | 10/2009 | Lucic | ...................... | B01L 3/5085 428/156 |

(Continued)

FOREIGN PATENT DOCUMENTS

| | | |
|---|---|---|
| DE | 102014204937 A1 | 9/2015 |
| EP | 3119825 A1 | 1/2017 |
| EP | 3342578 A1 * | 7/2018 |
| KR | 102165655 B1 | 10/2020 |
| WO | 2020225591 A1 | 11/2020 |

OTHER PUBLICATIONS

Extended European Search Report for Application No. 22173831.3; mailed Nov. 23, 2022; 7 pages.

(Continued)

*Primary Examiner* — Jerzi H Moreno Hernandez
(74) *Attorney, Agent, or Firm* — Billion & Armitage

(57) ABSTRACT

A method includes 3D printing a mold body from polycarbonate to form a cavity surface and 3D printing a permanent hydrophobic structure of polycarbonate on the cavity surface. The hydrophobic structure comprises a plurality of regularly shaped protrusions extending from and spaced 0 mm to 1.5 mm apart on the cavity surface. The patterned protrusions impart permanent hydrophobicity to the mold cavity surface.

7 Claims, 1 Drawing Sheet

(56) References Cited

U.S. PATENT DOCUMENTS

| | | | | |
|---|---|---|---|---|
| 2015/0306813 | A1* | 10/2015 | Roehrig | B29C 59/025 |
| | | | | 210/660 |
| 2016/0031121 | A1* | 2/2016 | Sugiura | B29C 33/02 |
| | | | | 249/111 |
| 2016/0052177 | A1* | 2/2016 | Chauvin | B29C 49/48 |
| | | | | 425/524 |
| 2020/0009763 | A1* | 1/2020 | Song | B29C 59/022 |

OTHER PUBLICATIONS

Fapu; Foaming without release agents, The PURe Liner principle; 2 pages.

FRIMO; PURe Liner—The innovation in release agent-free foaming; https://web.frimo.com/files/frimo_en/content/media-center/competence-sheets/FRIMO_PUReLiner_0812_EN_low.pdf (accessed Mar. 3, 2023).

Hennecke; Hard shell, intelligent core—with high pressure to impressive surfaces; https://www.hennecke.com/sites/default/files/downloads/PI_CLEARMELT_final_e.pdf (accessed Mar. 3, 2023).

Krauss Maffei; More Than Anattractive Surface; https://www.kraussmaffei.com/media/datastore/cms/media/imm/kraussmaffei/downloads/imm-rpm-oberflaechen-en.pdf (accessed Mar. 3, 2023).

Kunstoff; Joint project "Surface treatment 11"; dated Mar. 2019; 2 pages.

"Method of Manufacturing Patterned Film and Patterned Film Manufactured Thereby", Translation Description for KR102165655B1; 11 pages.

* cited by examiner

METHOD OF MANUFACTURING A MOLD BODY

CROSS-REFERENCE TO RELATED APPLICATION

This application claims benefit of priority to European Patent Application No. 22173831.3 filed on May 17, 2022, the entire disclosure of which is hereby incorporated by reference.

TECHNICAL FIELD OF THE INVENTION

The present disclosure relates to a method of manufacturing a mold body and a mold body produced by such a method.

BACKGROUND

For producing a polyurethane product, such as a polyurethane over molded product, injection molds are used that comprise at least one mold body for forming a cavity. Conventional polyurethane molds used in production are usually made from metal (such as steel or aluminum) by e.g., CNC cutting and polishing, or electrical discharge machining. These materials are used to cope with thermal effects during polyurethane forming and also provide a desired long service life of the molds. During production, a release agent is applied to a cavity of the mold to allow a smooth removal from the mold without any damage on the surface of the final product.

However, the use of a release agent involves a variety of problems. On the one hand, the mold release application step extends the process cycle time because the release agent has to be applied before each mold shot. Further, the quality of the final product depends on a correct dosage of the release agent and too much or too little of the release agent will have an impact on the quality. Further, the safety of the molding machine operator is impacted due to the presence of mold release agent mist in the production area. Finally, there is also an impact on the environment due to the presence of volatile organic compounds from the mold release agent.

Accordingly, there is a need to provide a method of manufacturing a polyurethane injection mold body that allows reduction or elimination of the application of a mold release agent when producing a polyurethane product with such a mold body.

SUMMARY

The present disclosure provides a method of manufacturing a polyurethane injection mold body, a use of such a mold body, a mold body, and a polyurethane product. Embodiments are contained the description and the drawings.

In one aspect, the present disclosure is directed to a method of manufacturing a polyurethane injection mold body. The method comprises forming a mold body having a cavity surface and creating a hydrophobic structure on the cavity surface. At least one mold body may be used with further components to form a cavity with a cavity surface for injecting polyurethane. According to the present disclosure, the cavity surface of the mold body is provided with a hydrophobic structure that provides a modified surface geometry. Due to this surface structure the amount of a mold release agent may be drastically reduced or even eliminated. The hydrophobic structure on the cavity surface contributes to a release of the polyurethane product from the cavity without significantly affecting the outer appearance and the functionality of the final polyurethane product.

According to an embodiment, the hydrophobic structure and the mold body are created simultaneously during one manufacturing step. This avoids an additional process step after the mold body has been manufactured.

According to a further embodiment, the hydrophobic structure is 3D printed. With a 3D process step, it is possible to create such a structure having very small dimensions with a desired shape with a good quality.

According to a further embodiment, the mold body and the structure are 3D printed, i.e., the mold body and the structure are produced in the same process step of 3D printing. The manufacturing costs can be significantly reduced when not only the hydrophobic structure but also the polyurethane injection mold body is manufactured by means of 3D printing.

According to a further embodiment, the mold body and/or the hydrophobic structure are made of e.g. polycarbonate. This material permits the production of the mold body with the hydrophobic structure at low cost with good quality. If a 3D printing process is applied, it is possible to use e.g., a UV curable polycarbonate based resin.

According to a further embodiment, the hydrophobic structure comprises a plurality of regularly shaped protrusions. Such regular or geometrical structure has shown good results for reducing or even eliminating the use of a release agent.

According to an embodiment, the protrusions are formed having shaped such as a hemisphere, a cone, a frustum, or a pyramid. Each of these shapes contributes to the object, to avoid or reduce the use of a release agent.

According to an embodiment, each protrusion is spaced from an adjacent protrusion at a distance of 0 to about 1.5 mm, for example to 0.5 to 1 mm. Such a distance between adjacent protrusions can still be produced with high accuracy and provides an easy and smooth release of the final product from the cavity.

According to a further embodiment, each protrusion has a quadratic base having an area of e.g. 0.25 to 1 $mm^2$. In this embodiment, the protrusion may have the shape of a frustum or a pyramid. If a pyramid shape is chosen, each protrusion may have a relatively sharp tip depending on the manufacturing machine limitation.

According to a further embodiment, the hydrophobic structure is created with a height of about 0.1 to 1 mm, e.g. 0.25 to 0.5 mm.

According to a further aspect of the present disclosure, the application is directed to the use of a mold body that has been manufactured as described above for producing a polyurethane product.

According to an embodiment, the polyurethane product is produced without providing the mold with a release agent.

According to a further embodiment, the disclosure is directed to a mold body that has been manufactured as described above.

According to a further aspect, the present disclosure is directed to a polyurethane product that is produced by injecting polyurethane in a mold comprising a mold body that has been manufactured as described above.

BRIEF DESCRIPTION OF THE DRAWINGS

The present invention is now described, by way of example with reference to the accompanying drawings, in which.

DETAILED DESCRIPTION

Figure 1:
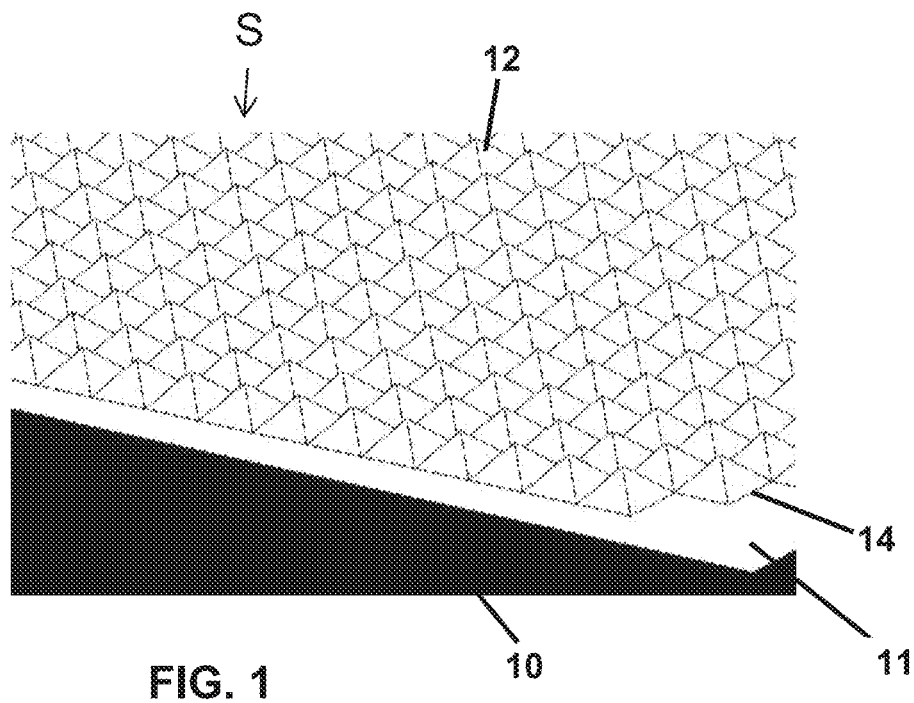
FIG. 1 is an enlarged schematic illustration of a hydrophobic structure on a cavity surface of a mold body, according to an embodiment of the present disclosure.

FIG. 1 depicts an enlarged schematic view of a mold body 10 that is used to form a cavity in which polyurethane will contact a cavity surface 11 of the mold body 10 when producing a polyurethane product by injection molding or overmolding. A mold may be composed of at least one mold body and further components commonly forming a cavity for receiving the polyurethane material.

As shown in FIG. 1, the cavity surface 11 of the mold body 10 is provided with a hydrophobic surface structure S.

When manufacturing the injection mold body shown in FIG. 1, the hydrophobic structure S and the mold body 10 are created during the same manufacturing step, e.g. by 3D printing a polycarbonate based resin material that can be hardened by UV radiation. In other words, not only the mold body 10 but also the hydrophobic structure S may be 3D printed of the same material, e.g. in one process step.

The hydrophobic structure S comprises a plurality of regularly shaped protrusions that may have various geometrical shapes to form a microstructure. In the embodiment shown in FIG. 1 the protrusions 12 have the shape of a pyramid having a sharp tip and a quadratic base with a length 14 between 0.5 and 1 mm. Of course, these dimensions may vary. Furthermore, each pyramid or protrusion 12 is spaced from an adjacent pyramid or protrusion at a distance that may be chosen between 0 and about 1.5 mm, e.g., as 0.5 or 1 mm. The hydrophobic structure S may be created with a height of about 0.1 to 1 mm, e.g. of 0.25 to 0.5 mm as measured perpendicular to the cavity surface 11.

Figure 2:
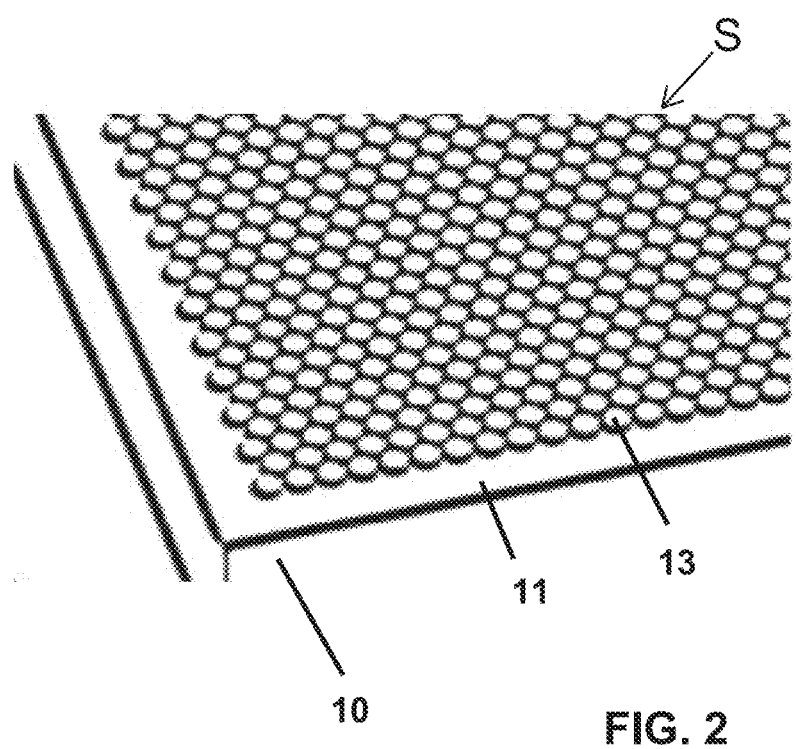
FIG. 2 is an enlarged schematic illustration of a further hydrophobic structure on a cavity surface of a mold body, according to another embodiment of the present disclosure.

FIG. 2 shows a further embodiment of a mold body 10 having a cavity surface 11 with a hydrophobic surface structure S being created on the cavity surface 11. In this embodiment, the protrusions are shaped as hemispheres having a radius of e.g. about 1 mm and a distance to adjacent hemispheres of about 1 mm.

As shown in FIG. 2, the protrusions of one row are shifted to the protrusions of an adjacent row such that one protrusion (having a circular ground area) is partly nested between two adjacent protrusions. Such arrangement minimizes the space between adjacent protrusions as compared to an arrangement in which four adjacent protrusions are located at the four corners of a square.

A polyurethane injection mold body that has been manufactured according to a method as described above can advantageously be used for producing a polyurethane product without applying a release agent to the mold before injecting the polyurethane material. At least, the amount of release agent can be significantly reduced without negatively affecting the release properties and the shape and quality of the final product.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A method, comprising:
manufacturing a mold body having a cavity surface; and
creating a permanent hydrophobic structure on the cavity surface, wherein the mold body and the hydrophobic structure are 3D printed, wherein the mold body or the hydrophobic structure are made of polycarbonate, wherein the hydrophobic structure comprises a plurality of regularly shaped protrusions, and wherein each protrusion is spaced from an adjacent protrusion at a distance of 0 mm to 1.5 mm.

2. The method according to claim 1, wherein the hydrophobic structure and the mold body are created simultaneously.

3. The method according to claim 1, wherein the mold body and the hydrophobic structure are made of polycarbonate.

4. The method according to claim 1, wherein the protrusions are formed as a shape selected from a list consisting of a hemisphere, a cone, a frustum, and a pyramid.

5. The method according to claim 1, wherein each protrusion has a quadratic base having an area of 0.25 mm² to 1 mm².

6. The method according to claim 1, wherein each protrusion has a tip.

7. The method according to claim 1, wherein the hydrophobic structure is created with a height of 0.1 mm to 1 mm.

\* \* \* \* \*